United States Patent

Aoshima

[11] Patent Number: 6,070,087
[45] Date of Patent: May 30, 2000

[54] SELECTIVE CALL RECEIVER WITH PRIORITY BASED NETWORK SELECTION

[75] Inventor: Takashi Aoshima, Shizuoka, Japan

[73] Assignee: NEC Corporation, Tokyo, Japan

[21] Appl. No.: 09/317,182

[22] Filed: May 24, 1999

Related U.S. Application Data

[63] Continuation of application No. 08/770,830, Dec. 20, 1996, Pat. No. 5,978,686.

[30] Foreign Application Priority Data

Dec. 21, 1995 [JP] Japan .................................. 7-333087

[51] Int. Cl.[7] ...................................................... H04Q 7/00
[52] U.S. Cl. ......................... 455/525; 455/426; 455/552; 455/67.1
[58] Field of Search .................................. 455/426, 432, 455/433, 434, 435, 443, 512, 525, 552, 553, 62, 63, 179.1, 185.1, 186.1, 67.1; 709/222, 224

[56] References Cited

U.S. PATENT DOCUMENTS

| | | |
|---|---|---|
| 4,734,694 | 3/1988 | Umetsu et al. . |
| 5,101,500 | 3/1992 | Marui ...................................... 455/551 |
| 5,196,842 | 3/1993 | Gomez et al. ........................... 455/525 |
| 5,206,855 | 4/1993 | Schwendeman et al. . |
| 5,254,986 | 10/1993 | DeLuca .............................. 340/825.44 |
| 5,428,666 | 6/1995 | Fyfe et al. .............................. 455/551 |
| 5,450,613 | 9/1995 | Takahara et al. ....................... 455/517 |
| 5,586,338 | 12/1996 | Lynch et al. ............................ 455/525 |
| 5,590,397 | 12/1996 | Kojima ................................. 455/186.1 |
| 5,596,723 | 1/1997 | Romohr .................................. 709/222 |
| 5,722,070 | 2/1998 | Alford .................................... 455/434 |

FOREIGN PATENT DOCUMENTS

| | | |
|---|---|---|
| WO 91/06190 | 5/1991 | European Pat. Off. . |
| 0 455 821 A1 | 11/1991 | European Pat. Off. . |

*Primary Examiner*—Nguyen Vo
*Assistant Examiner*—Lester G. Kincaid
*Attorney, Agent, or Firm*—Sughrue, Mion, Zinn, Macpeak & Seas, PLLC

[57] ABSTRACT

In a selective call receiver which is usable in a plurality of networks, a setting data memory previously stores network identifiers for identifying the networks and network priorities which are assigned to the networks, respectively. After identifying a transmitting network from which the calling signal is received by searching the network identifiers for a received network identifier included in the calling signal, a single network is selected from one or more identified transmitting networks based on the network priorities. The receiver is set to a receiving state of the single network.

4 Claims, 4 Drawing Sheets

FRAME FORMAT OF SELECTIVE CALLING SIGNAL

| SYNC | NETWORK INFORMATION (NET-I) | ADDRESS (ID) | MESSAGE |
|---|---|---|---|

SETTING DATA MEMORY

| NETWORK INFORMATION | ID LINK | ID NUM. | NETWORK PRIORITY INFORMATION |
|---|---|---|---|
| NET-$I_A$ | ID-$L_A$ | $ID_1$ $ID_2$ ⋮ | $Na = 1$ |
| NET-$I_B$ | ID-$L_B$ | $ID_n$ $ID_{n+1}$ ⋮ | $Nb = 2$ |
| ⋮ | ⋮ | ⋮ | ⋮ |

SELECTIVE CALL RECEIVER WITH PRIORITY BASED NETWORK SELECTION

This is a continuation of application Ser. No. 08/770,830 filed Dec. 20, 1996, now U.S. Pat. No. 5,978,686 the disclosure of which is incorporated herein by reference.

BACKGROUND OF THE INVENTION

1. Field of the Invention

The present invention relates to a radio selective call receiver and, more specifically, to a radio selective call receiver which is usable in a plurality of network service areas.

2. Description of the Related Art

In selective calling networks, since each network generally employs a different frequency and a different signal scheme, a channel-fixed receiver cannot be used in another network. In order to overcome such an inconvenience, there has been proposed a receiver having a channel roaming function of sequentially changing the receiving channel.

However, compared with the channel-fixed receiver, the channel-roaming receiver consumes a larger amount of battery power. Therefore, frequently changing network service areas causes considerably inefficient utilization of battery power.

SUMMARY OF THE INVENTION

An object of the present invention is to provide a radio selective call receiver which is able to perform a receiving operation with reduced power consumption.

Another object of the present invention is to provide a radio selective call receiver and a control method which are capable of setting a receiving channel with efficient utilization of battery power.

Still another object of the present invention is to provide a radio selective call receiver which is capable of detecting a call occurrence efficiently.

According to an aspect of the invention, in a selective call receiver which is usable in service areas of a plurality of networks, a setting data memory previously stores a plurality of network identifiers for identifying the networks and a plurality of network priorities which are assigned to the networks, respectively. A transmitting network from which the calling signal is received is identified by searching the network identifiers for a received network identifier included in the calling signal. When a transmitting network is found, a single network is selected from one or more identified transmitting networks based on the network priorities. And, the receiver is set to a receiving state of the single network.

It is preferable that the network priorities are determined by priority set values which are previously assigned to the networks, respectively. Further, the selective call receiver is provided with counters corresponding to the networks, respectively. When transmitting networks are identified, each of the respective counters corresponding to the transmitting networks counts a frequency of reception of the calling signal from each transmitting network. When one of the counters reaches a priority set value first, the transmitting network corresponding to that counter is selected as the single network.

As described above, since priority is given to a calling signal received from a network which is previously given a higher priority, the receiving state is rapidly determined, resulting in reduced channel roaming time and reduced battery power consumption.

According to another aspect of the present invention, the selective call receiver detects a call occurrence from the calling signal by searching a predetermined number of identification numbers for a calling number included in the calling signal. The identification numbers are stored in the setting data memory such that the identification numbers are divided into a plurality of groups corresponding to the networks, respectively. The call occurrence is detected by searching a group corresponding to the identified transmitting network for a calling number included in the calling signal.

Since the identification numbers are grouped under the networks and a specified group is searched for a target identification number, a call occurrence is efficiently detected from the calling signal, achieving the rapid call detection and the efficient battery utilization.

DESCRIPTION OF THE PREFERRED EMBODIMENT

Figure 1:
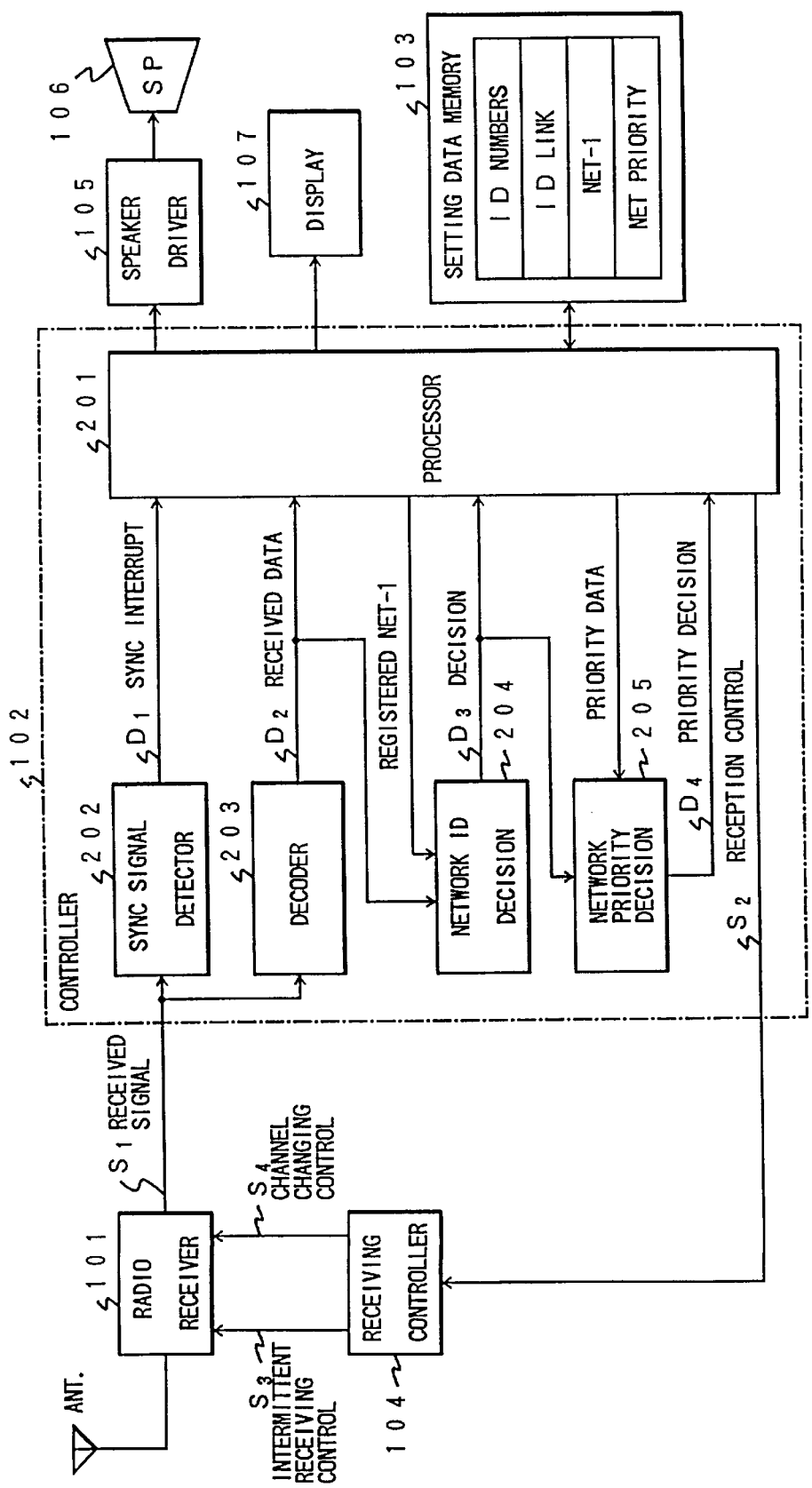
FIG. 1 is a block diagram showing an embodiment of a radio selective call receiver according to the present invention.

Referring to FIG. 1, a selective call receiver according to the present invention is comprised of a radio receiver 101, a controller 102, a setting data memory 103, and a receiving controller 104. The radio receiver 101 receives a radio selective calling signal of a given format (see FIG. 5) from a radio base station (not shown) through a receiving antenna, and amplifies and demodulates it into a received signal $S_1$.

The controller 102 performs predetermined operations using the setting data memory 103 as described later. Further, the controller 102 outputs a reception control signal $S_2$ to the receiving controller 104 which, under the control of the controller 102, outputs an intermittent receiving control signal $S_3$ and a channel changing control signal $S_4$ to the radio receiver 101. Therefore, under the control of the controller 102, the radio receiver 101 performs the channel roaming and the intermittent receiving operation at a receiving channel.

The setting data memory 103 previously stores predetermined calling numbers of the receiver itself (hereinafter referred to as ID numbers) for predetermined networks A, B, C, . . . , respectively, registered network information (NET-$I_A$, NET-$I_B$, . . . ) for identifying the predetermined networks A, B, C, . . . , network priority information, and ID link information (ID LINK). The registered network information includes a frequency channel and a signal scheme for each network. The network priority information is predetermined priorities which are previously given to the networks, respectively. The ID link information is used to efficiently search for a target ID number. The setting data memory 103 may be formed with an EEPROM (electrically-erasable programmable read-only memory). An example of stored data in the setting data memory 103 is shown in FIG. 6.

The controller 102 is connected to a speaker driver 105 which drives a speaker 106 and further to a display 107 such as a liquid-crystal display. Under the control of the controller 102, the speaker 106 makes a beep to inform the user of an incoming call and the display 107 displays received messages on screen according to the user's instruction. It should be noted that a program memory, a message memory, a keypad, and other necessary components are omitted from the figure for simplicity.

The controller 102 controls the entire receiver operations, for example, call detection by searching the setting data memory 103, driving the speaker 106 to inform the user of the incoming call, displaying a message on the display 107, and channel designation and intermittent receiving control by controlling the radio receiver 101. The controller 102 includes a processor 201 which is connected to a sync signal detector 202, a decoder 203, a network identification decision processor 204, and a network priority decision processor 205.

Figures 4, 5, 6:
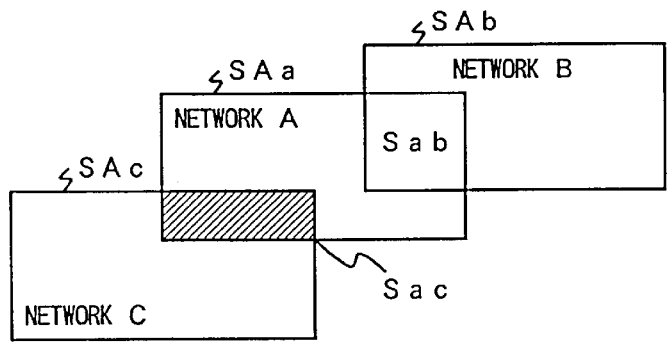
FIG. 4 is a schematic diagram showing an example of network service areas to explain the operation of the selective call receiver according to the present invention.
FIG. 5 is a diagram showing the frame format of a selective calling signal.
FIG. 6 is a schematic diagram showing an example of the contents of a setting data memory in the selective call receiver of FIG. 1.

The sync signal detector 202 detects a sync signal (SYNC) of each frame from the received signal $S_1$ (see FIG. 5). Upon detecting the sync signal, the sync signal detector 202 outputs a sync interrupt signal $D_1$ to the processor 201. The decoder 203 performs a decoding operation with error-correction of the received signal $S_1$ and then outputs decoded and error-corrected data $D_2$ to the processor 201.

The network identification decision processor 204 makes a decision as to whether the network information NET-I of each frame of the received data $D_2$ is coincident with one of the registered NET-$I_A$, NET-$I_B$, ..., which are stored in the setting data memory 103. When a received NET-I is identical to a registered NET-I, the decision result $D_3$ indicating the NET-I is sent to the processor 201 and the network priority decision processor 205.

The network priority decision processor 205, when receiving the decision result $D_3$ indicating the NET-I from the network identification decision processor 204, determines a higher-priority network based on the priority data stored in the setting data memory 103 and sends priority decision data $D_4$ to the processor 201, which will be described in detail referring to FIG. 3.

The processor 201 implements a function of detecting a call occurrence by detecting a calling number (or address) included in each frame of the received signal $S_1$ and then searching the setting data memory 103 for the received calling number. When the call is detected, the processor 201 controls the speaker driver 105 and the display 107 to inform the user of the incoming call and to display a received message on screen. Further, based on the decision result $D_3$ and the priority decision data $D_4$, the processor 201 instructs the receiving controller 104 to set a receiving channel to that of the network indicated by the decision result $D_3$. The receiving control of the controller 102 will be described hereinafter.

Receiving Control

Figure 2:
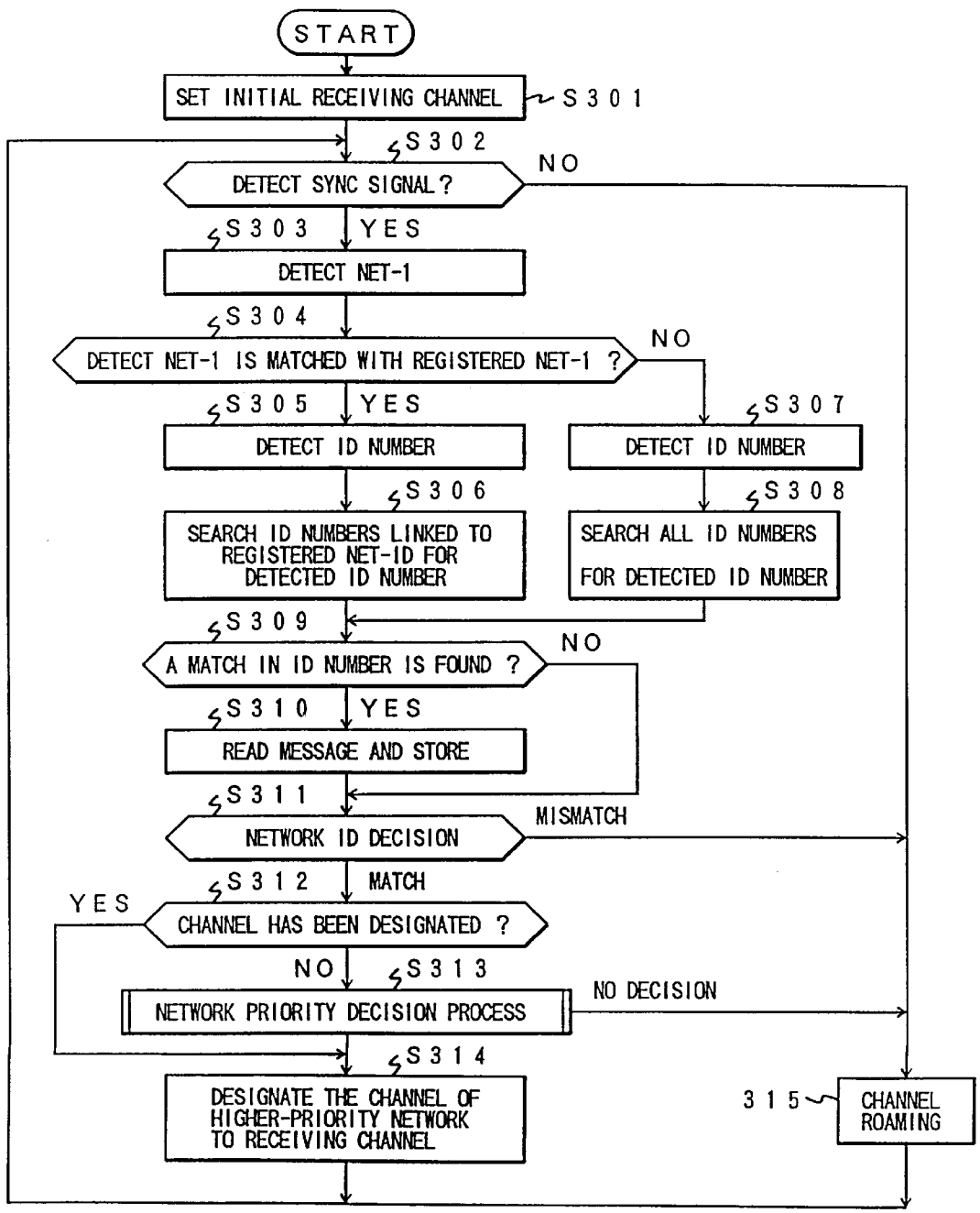
FIG. 2 is a flowchart showing a channel changing operation of the radio selective call receiver of FIG. 1.

Referring to FIG. 2, when power is turned on, the processor 201 instructs the receiving controller 104 to set the radio receiver 101 to the receiving channel of the highest-priority network by referring to the network priority data stored in the setting data memory 103 (step S301). Therefore, the initial receiving control is performed based on the setting data corresponding to a predetermined network given the highest priority.

In receiving control, when a sync signal is detected, that is, sync interrupt $D_1$ occurs (YES in step 302), the network identification decision processor 204 detects the network information NET-I from a frame of the received data $D_2$ (step S303) and determines whether the detected NET-I is matched with a sequentially selected one of registered NET-I from the setting data memory 103 (step S304).

When the detected NET-I is matched with one registered NET-I, that is, the decision result $D_3$ indicating the matched NET-I is received from the network identification decision processor 204 (YES in step S304), the processor 201 detects a calling number from the frame of the received data $D_2$ (step S305) and starts searching only the ID numbers linked to the matched NET-I stored in the setting data memory 103 for the received calling number (S306). On the other hand, when it is not matched with any registered NET-I (NO in step S304), the processor 201 detects a calling number from a frame of the received data $D_2$ (step S307) and starts searching all the ID numbers stored in the setting data memory 103 for the received calling number (S308).

When a match in ID number is found (YES in step S309), the processor 201 reads a message from the frame of the received data $D_2$ and stores it onto a message memory (not shown) (step S310). Further, in the case where the detected NET-I is matched with one registered NET-I (MATCH in S311), it is checked whether a receiving channel has been already designated (step S312). If not (NO in step S312), a network priority decision process is performed to determine a higher-priority network by the network priority decision processor 205 (step S313) and then the channel of the higher-priority network is designated to a receiving channel (step S314). If a receiving channel has been already designated (YES in step S312), control goes to the step S314 without performing the network priority decision process (step S313). Therefore, even in the case where the selective call receiver is located in an overlapped area of a plurality of network service areas, a higher-priority network is automatically selected and the receiving channel is rapidly fixed to that of the higher-priority network without roaming channels.

On the other hand, when the detected NET-I is not matched with any registered NET-I (MISMATCH in S311), when the sync signal is not detected from the received signal $S_1$ (NO in step S302), or when the network priority decision process produces no decision result, the channel roaming is performed (step S315). More specifically, a receiving channel of the radio receiver 101 is sequentially changed by the receiving controller 104 until the sync signal is detected (YES in step S302), a detected NET-I is matched with at least one registered NET-I (MATCH in step S311), and any decision result is produced by the network priority decision process (step S313).

Network Priority Decision

For simplicity, it is assumed that the setting data memory 103 previously stores the network information NET-$I_A$, NET-$I_B$, and NET-$I_C$ corresponding to three different networks A, B, and C, respectively. Further, in this embodiment, a network to be selected is determined by counting reception frequencies in the respective networks. Three counters $C_A$, $C_B$, and $C_C$ may be used to determine a receiving channel. The respective counters are set to initial values $N_a$, $N_b$, and $N_c$ which are in order of increasing or decreasing value, for example, $N_a=1$, $N_b=2$, and $N_c=3$. The network corresponding to a counter which reaches zero earlier is given a higher priority. Therefore, in the case of $N_a=1$, $N_b=2$, and $N_c=3$, the network A corresponding to the counter $C_A$ is given top priority and the network B corresponding to the counter $C_B$ is given second priority. These counters may be implemented in the processor 201 or the network priority decision processor 205. The same function as the network priority decision processor 205 may be implemented in the processor 201.

When a detected NET-I is matched with a registered NET-I (MATCH in step S311 of FIG. 2) and when a channel has never been designated (NO in step S312), the network priority decision process (S313) is started.

Figure 3:
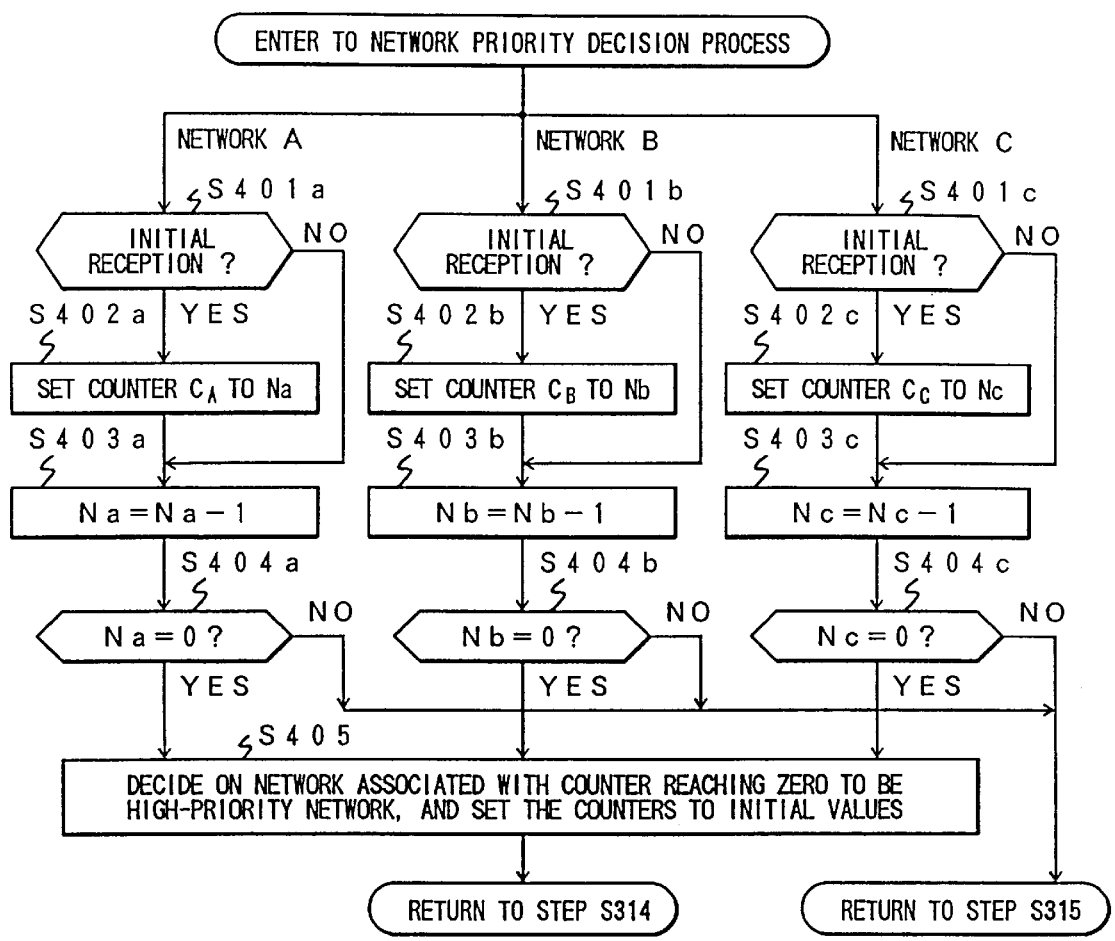
FIG. 3 is a flowchart showing an example of a network priority decision process in the channel changing operation shown in FIG, 2.

Referring to FIG. 3, first, it is checked whether the calling signal of a network A, B, or C is initially received (S401a, S401b, or S401c) and, if it is an initial reception, the corresponding counter is set to its initial value $N_a$, $N_b$, or $N_c$ (S402a, S402b, or S402c). Subsequently, the counter decrements from the last counter's value (S403a, S403b, or S403c). Therefore, the counter decrements each time a calling signal of the same network is received. For example, in cases where two calling signals of the respective networks A and B are sequentially received in the overlapped area of the network service areas A and B (YES in steps S401a and S401b), the respective counters $C_A$ and $C_B$ are set to the initial values $N_a$ and $N_b$ (steps S402a and S402b) and then the respective counters $C_A$ and $C_B$ decrements from the counter's values $N_a$ and $N_b$ (steps S403a and S403b).

After the counter decrements from the last counter's value, it is checked whether the counter reaches zero (S404a, S404b, or S404c). When it reaches zero (YES in S404a, S404b, or S404c), the network priority decision processor 205 decides on the network corresponding to the counter reaching zero to be higher-priority network and outputs the priority decision data $D_4$ to the processor 201, and then all the counters are set to initial values (step S405). After that, control returns to the step S314 of FIG. 2. On the other hand, if the counter does not reach zero (NO in S404a, S404b, or S404c), control returns to the step 315 of FIG. 2.

More specifically, consider that the priority information $N_a=1$, $N_b=2$, and $N_c=3$ are stored in the setting data memory 103 and the respective counters $C_A$, $C_B$, and $C_C$ are set at these initial values 1, 2, and 3 in the steps S402a. In this case, the network A is given top priority. When a calling signal of the network A is initially received (steps S401a, S402a), the counter $C_A$ decrements from the initial value of 1 (S403a) and reaches zero (YES in step S404a). Therefore, once a calling signal of the network A is received, the receiving channel of the receiver is promptly fixed to the channel of the network A. However, the receiving channel cannot be fixed to the channel of the network B until the calling signal of the network B is received twice, and further it cannot be fixed to the channel of the network C until the calling signal of the network C is received three times.

Referring to FIG. 4, in cases where the selective call receiver is located in the overlapped area $S_{ac}$ of the network service areas $SA_c$ and $SA_a$, even if a calling signal of the network C is initially received, the receiving channel is rapidly fixed to the channel of the network A because a higher priority is given to the network A than the network C as described before. Similarly, in cases where the selective call receiver is located in the overlapped area of the network service areas $SA_b$ and $SA_c$, the receiving channel is earlier fixed to the channel of the network B because a higher priority is given to the network B than the network C.

Referring to FIG. 6, the setting data memory 103 previously stores network information NET-I, ID link information, ID numbers, and network priority information. Since predetermined groups of ID numbers are previously assigned to the networks, respectively, it is preferable that the respective ID link information ID-$L_A$, ID-$L_B$, . . . corresponding to the networks are attached to the predetermined groups of ID numbers. This causes the ID number searching operation (step S306 of FIG. 2) to be efficiently performed.

What is claimed is:

1. A method for selecting a single network from a plurality of transmitting networks, the method comprising the steps of:

(a) presetting an initial count value, respectively for each of said transmitting networks, to provide varying priority levels;

(b) concurrently counting a frequency of reception of a calling signal from each transmitting network and respectively adjusting the initial count values of step (a) to produce a reception count value for each transmitting network; and (c) selecting the single network for which the reception count value of step (b) reaches a predetermined priority set value first.

2. A network priority decision processor, adapted for use with a receiver which concurrently receives network identification signals from a first and a second network during a counting period, and a processor and a network identification decision processor, which outputs a network identification signal upon receipt of a signal from a network, comprising:

a first counter, corresponding to a first network, and storing a first network priority information corresponding to a first network; and a second counter, corresponding to a second network, and storing a second network priority information corresponding to a second network;

wherein said first and second counters are connected to said receiver and count a receipt of a network identification signal corresponding to that counter and wherein priority is determined based on the counter to first reach a predetermined target value.

3. A network decision priority processor as in claim 2 wherein at least one of first and second counters count down.

4. A network decision priority processor as in claim 2 wherein at least one of first and second counters count up.

* * * * *